US008527417B2

(12) United States Patent
Telle et al.

(10) Patent No.: US 8,527,417 B2
(45) Date of Patent: Sep. 3, 2013

(54) METHODS AND SYSTEMS FOR AUTHENTICATING AN IDENTITY OF A PAYER IN A FINANCIAL TRANSACTION

(75) Inventors: Todd N. Telle, St. Louis, MO (US); Sue Ellen Moskowitz, New Rochelle, NY (US)

(73) Assignee: MasterCard International Incorporated, Purchase, NY (US)

( * ) Notice: Subject to any disclaimer, the term of this patent is extended or adjusted under 35 U.S.C. 154(b) by 239 days.

(21) Appl. No.: 12/834,637

(22) Filed: Jul. 12, 2010

(65) Prior Publication Data

US 2012/0011066 A1    Jan. 12, 2012

(51) Int. Cl.
*G06Q 40/00* (2012.01)
(52) U.S. Cl.
USPC .................................. 705/44; 705/39; 705/35
(58) Field of Classification Search
None
See application file for complete search history.

(56) References Cited

U.S. PATENT DOCUMENTS

| | | | |
|---|---|---|---|
| 5,604,803 A * | 2/1997 | Aziz | 713/155 |
| 5,708,422 A | 1/1998 | Blonder et al. | |
| 6,175,831 B1 * | 1/2001 | Weinreich et al. | 1/1 |
| 7,003,501 B2 | 2/2006 | Ostroff | |
| 7,014,107 B2 | 3/2006 | Singer et al. | |
| 7,194,426 B1 * | 3/2007 | Box | 705/26.1 |
| 2004/0243517 A1 * | 12/2004 | Hansen | 705/64 |
| 2005/0091492 A1 * | 4/2005 | Benson et al. | 713/170 |
| 2005/0108096 A1 * | 5/2005 | Burger et al. | 705/14 |
| 2006/0168264 A1 * | 7/2006 | Baba et al. | 709/230 |
| 2006/0282382 A1 * | 12/2006 | Balasubramanian et al. | 705/44 |
| 2007/0005955 A1 * | 1/2007 | Pyle et al. | 713/156 |
| 2007/0078759 A1 * | 4/2007 | Lilly et al. | 705/38 |
| 2007/0233615 A1 * | 10/2007 | Tumminaro | 705/75 |
| 2007/0255580 A1 * | 11/2007 | Cole et al. | 705/1 |
| 2008/0071682 A1 | 3/2008 | Dominguez | |
| 2008/0103972 A1 * | 5/2008 | Lanc | 705/44 |
| 2008/0150677 A1 * | 6/2008 | Arakawa | 340/5.2 |
| 2008/0313061 A1 * | 12/2008 | Eugenio Donato Renato Limlengco | 705/30 |
| 2009/0031125 A1 * | 1/2009 | Bjorn | 713/155 |
| 2009/0106138 A1 * | 4/2009 | Smith et al. | 705/35 |
| 2009/0282258 A1 * | 11/2009 | Burke et al. | 713/184 |
| 2010/0106644 A1 * | 4/2010 | Annan et al. | 705/42 |
| 2010/0125635 A1 * | 5/2010 | Axelrod et al. | 709/206 |
| 2011/0307388 A1 * | 12/2011 | Kim et al. | 705/67 |

OTHER PUBLICATIONS

Network password authentication method, involves using personal account to log in network system by user, and transmitting dynamic password to user for password authentication of user network behavior; Zheng, J.; China P. Rep. Pat. No. CN 101141252; 2008; 4-pages.*
http://en.wikipedia.org/wiki/One-time_password; "One-Time Password"; Mar. 4, 2010, Wikipedia.
International Search Report/Written Opinion for PCT/US11/43500 mailed Oct. 20, 2011, 7 pages.

* cited by examiner

*Primary Examiner* — Gregory Johnson
(74) *Attorney, Agent, or Firm* — Armstrong Teasdale LLP

(57) ABSTRACT

A system and computer-based method for using a one-time password (OTP) to authenticate an identity of a cardholder in a financial transaction initiated by the cardholder with a merchant via a first communication medium. A one-time password is generated at an interchange computer system and transmitted to the cardholder via a second communication medium. The cardholder is prompted to enter access credential information, including the one-time password. When the entered access credential information is verified (e.g., the entered one time password is equal to the generated one-time password), a successful authentication is indicated to the merchant.

20 Claims, 12 Drawing Sheets

METHODS AND SYSTEMS FOR AUTHENTICATING AN IDENTITY OF A PAYER IN A FINANCIAL TRANSACTION

BACKGROUND OF THE INVENTION

This invention relates generally to systems and methods for authenticating a cardholder when performing a financial transaction and, more particularly, to network-based systems and methods for authenticating an identity of a cardholder using a one-time password.

Financial transaction cards are widely used in the United States and elsewhere as a means to attract financial accounts to financial institutions and, in the case of credit cards, as a medium to create small loans and generate interest income for financial institutions.

The financial transaction card industry is subject to certain well-known problems. For example, in the credit card industry it is well-known that at least some persons will engage in fraudulent activities through either the theft of a credit card or a credit card number. The utilization of financial transaction cards in online transactions exacerbates the risk of fraudulent activity. Financial transaction card companies have thus implemented increased security measures to reduce the instances of such fraudulent activity. These increased security measures utilize a standardized protocol for authenticating a user by communicating transaction information between computer devices and requiring a user to provide authentication credentials (e.g., a user name and/or password) in addition to a credit card number to complete a transaction with a merchant.

The proliferation of password-protected online services can make remembering which password corresponds to which service challenging. A user may attempt to solve this problem of password recall by using an easily remembered password and/or by using the same password for multiple services. As a result, the password used for authenticating the user in the context of a financial transaction may be relatively easily compromised. Furthermore, because a user's account information and password may change infrequently or not at all, once compromised, such information may be stored or distributed for subsequent and/or repeated fraudulent use.

Accordingly, a system and method are needed for authenticating the identity of a user in a financial transaction based on a dynamically generated, one-time password.

BRIEF SUMMARY OF THE INVENTION

In one aspect, a method is provided for authenticating an identity of a cardholder in a financial transaction initiated by the cardholder with a merchant via a first communication medium. The method includes receiving a purchase authentication request message from the merchant at an interchange computer system. The purchase authentication request message is associated with the cardholder and the financial transaction. A one-time password is generated for the financial transaction at the interchange computer system. The one-time password is transmitted to the cardholder via a second communication medium that is different from the first communication medium. The cardholder is prompted to enter the one-time password. The entered one-time password is determined to be equal to the generated one-time password. A positive purchase authentication response message is transmitted to the merchant, indicating a successful authentication of the identity of the cardholder.

In another aspect, a system is provided for authenticating an identity of a cardholder in a financial transaction initiated by the cardholder with a merchant via a first communication medium. The system includes a memory device, a communication interface, and a processor coupled to the memory device and the communication interface. The memory device is configured to store contact information associated with the cardholder. The communication interface configured to receive a purchase authentication request message from a merchant computer system. The processor is programmed to generate a one-time password for the financial transaction and to provide the one-time password to the cardholder via a second communication medium that is different from the first communication medium using the contact information associated with the cardholder. The processor is also programmed to prompt the cardholder to enter the one-time password, determine that the entered one-time password is equal to the generated one-time password, and transmit a positive purchase authentication response message to the merchant computer system indicating a successful authentication of the identity of the cardholder.

In yet another aspect, a computer-readable medium is provided. The computer-readable medium includes computer executable instructions for authenticating an identity of a cardholder in a financial transaction initiated by the cardholder with a merchant via a first communication medium. The computer executable instructions are configured to instruct a computer to receive a purchase authentication request message from the merchant. The purchase authentication request message is associated with the cardholder and the financial transaction. The computer executable instructions are further configured to instruct the computer to generate a one-time password including a sequence of random characters for the financial transaction, to transmit the one-time password to the cardholder via a second communication medium that is different from the first communication medium, and to prompt the cardholder to enter the one-time password. The computer executable instructions are further configured to instruct the computer to determine that the entered one-time password is equal to the generated one-time password and to transmit a positive purchase authentication response message to the merchant indicating a successful authentication of an identity of the cardholder.

DETAILED DESCRIPTION OF THE INVENTION

Figure 1:
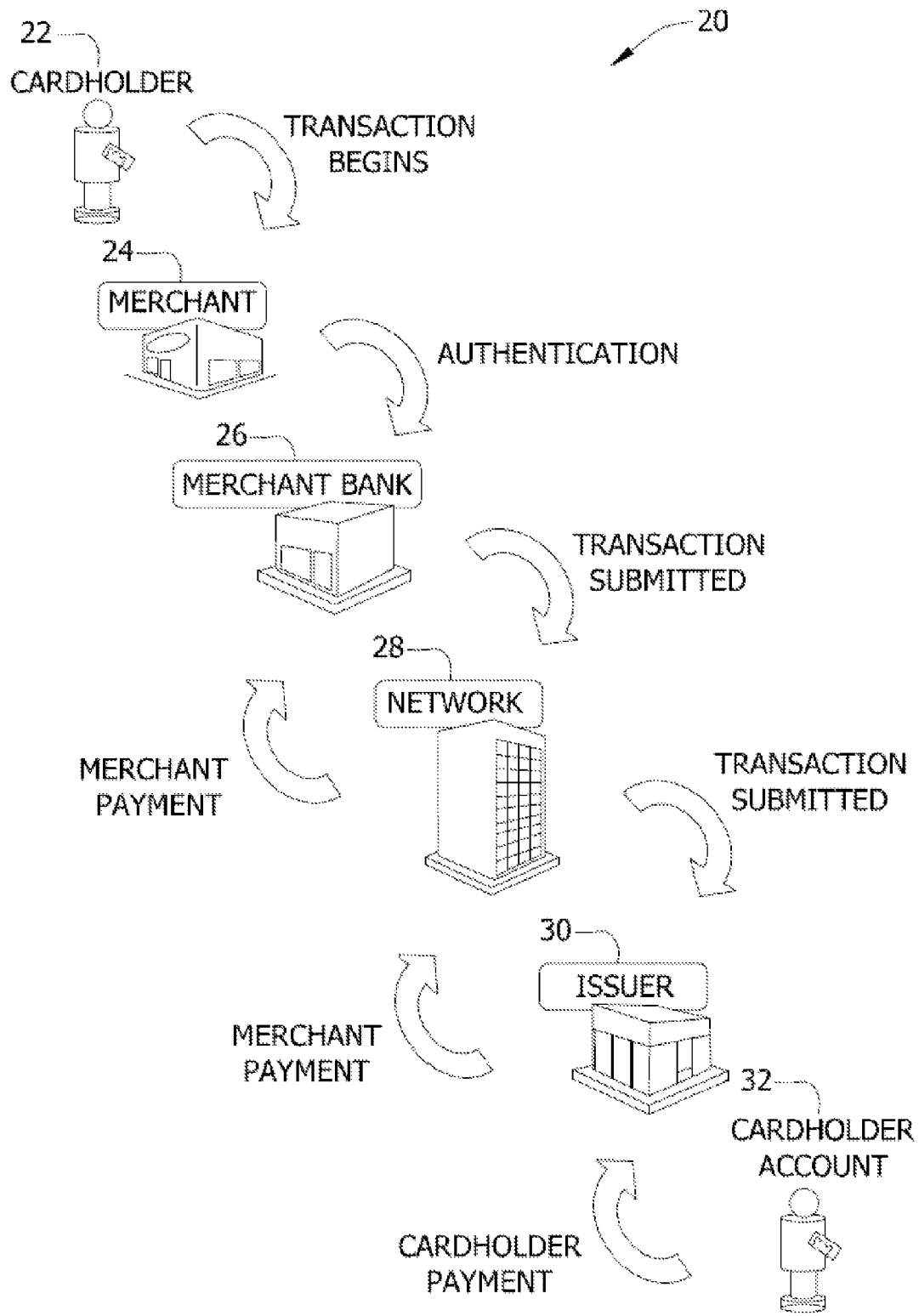
FIG. 1 is a schematic diagram illustrating a known multi-party transaction card industry system for enabling ordinary payment-by-card transactions in which the merchants and issuer do not need to have a one-to-one special relationship.

The methods and systems described herein relate to a financial transaction card payment system, such as a credit card payment system using the MasterCard® interchange (MasterCard is a registered trademark of MasterCard International Incorporated located in Purchase, New York). The MasterCard® interchange is a proprietary communications standard promulgated by MasterCard International Incorporated® for the exchange of financial transaction data between financial institutions that have registered with MasterCard International Incorporated®.

The following detailed description illustrates embodiments of the invention by way of example and not by way of limitation. It is contemplated that the invention has general application to processing financial transaction data by a third party in industrial, commercial, and residential applications. As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

As used herein, the term "transaction card" refers to any suitable transaction card, such as a credit card, a debit card, a membership card, a promotional card, a frequent flyer card, an identification card, a prepaid card, a gift card, and/or any other device that may hold payment account information, such as mobile telephones, personal digital assistants (PDAs), and key fobs.

As used herein, a "communication medium" includes, but is not limited to, a communication channel such as the Internet, a local area network (LAN), a wide area network (WAN), a virtual private network (VPN), a wireless LAN (WLAN), a personal area network (PAN), a mobile telecommunications network, a radio frequency (RF) connection, a wired serial data connection, a wired parallel data connection, and/or any system or apparatus for communicating information between computer devices. Alternatively, or in addition, a communication medium may include a protocol and/or a standard defining interaction between computer devices over a communication channel. For example, a protocol and/or a standard may include, without limitation, Hypertext Transfer Protocol (HTTP), Session Initiation Protocol (SIP), Simple Mail Transfer Protocol (SMTP), an online chat protocol (e.g., Extensible Messaging and Presence Protocol), Global Standard for Mobile Communications (GSM®) (GSM is a registered trademark of GSM MoU located in Deansgrange, Ireland), High Speed Packet Access (HSPA), Short Message Service (SMS), Multimedia Messaging Service (MMS), Wireless Application Protocol (WAP), Transmission Control Protocol (TCP), User Datagram Protocol (UDP), and/or Internet Protocol (IP).

A computer device may include a communication interface configured to communicate via a communication medium. For example, a communication interface may include, without limitation, a wired or wireless network adapter, a wireless data transceiver for use with a mobile telecommunications network and/or RF communication, a serial data communication adapter, and/or a parallel data communication adapter.

The embodiments described herein are directed to systems and methods for authenticating a user when performing a financial transaction over one or more computer devices. The financial transaction is performed by a user of a financial transaction card, such as a credit card, debit card, or other financial transaction card. These users are referred to as cardholders. A cardholder is issued a transaction card by an issuer or an issuing bank. The cardholder is able to use the transaction card at participating merchants to initiate financial transactions. The merchant processes these transactions using a point-of-sale (POS) device that captures certain transaction information and communicates this information over an interchange network to an acquiring bank and ultimately to the issuer. Information is then exchanged between these parties over the interchange network until the transaction is completed. The computer devices communicate with one another by using a standard computer protocol.

In the exemplary embodiment, prior to completing a financial transaction, the systems and methods transmit a dynamically generated one-time password (OTP) to the cardholder via a preconfigured communication medium and prompt the cardholder to enter the OTP. The preconfigured communication medium may be defined by the user in a previous authenticated or trusted session. For example, the user may define a telephone number to which an OTP should be transmitted as a short message service (SMS) message, which may also be referred to as a text message or simply a text.

The cardholder is authenticated within the transaction system by comparing the entered value to the generated OTP. This authentication process may be practiced within the context of an existing purchase authentication protocol, which is the defined communication framework controlling the exchange of data between the computer devices. The protocol described herein is an authentication protocol commonly used to provide increased security in financial card transactions. The authentication protocol permits the cardholder to establish authentication credentials (e.g., a user name and/or password) for the transaction card issued to them. When the cardholder later attempts to perform a financial transaction with the card, the cardholder must provide, in addition to a credit card number or other assigned number, the associated authentication credentials to complete the transaction. According to embodiments described herein, the authentication credentials may include the OTP.

The authentication protocol thus provides a standard method of establishing and communicating the authentication credentials in conjunction with financial card transactions. In operation, the authentication protocol defines the format and the sequence of information exchanged between a cardholder, a merchant, and the interchange network. Practicing the described methods in accordance with the existing protocol facilitates improving the security of financial transactions without requiring modifications to computer systems operated by cardholders and merchants, and without requiring the use of specialized hardware, such as a hardware security token, by the cardholder. Furthermore, embodiments described herein may be practiced with any existing or future financial transaction processing protocol.

In operation, a cardholder initiates a financial transaction with a merchant (e.g., directly or over an interchange network) via a client computer device associated with the cardholder. Via an input device of the client computer device, the cardholder indicates to a merchant computer system the cardholder's intention to purchase one or more items, such as products and/or services offered by the merchant. In an exemplary embodiment, the client computer device transmits a purchase request message to the merchant computer system.

The merchant computer system is configured to execute a merchant plug-in (MPI) software component for verifying financial transactions. Accordingly, the merchant computer system and/or the MPI software component may be referred to as an MPI device. The MPI device is utilized by the merchant to communicate an account number to a server system associated with the interchange network, also referred to as an interchange computer system herein. In an exemplary embodiment, the MPI device receives the purchase request from the client computer device and, in response, transmits a verify enrollment request (VEReq) message including the account number to a directory server of the interchange computer system.

According to one embodiment, the account number is specific to (e.g., assigned to) the cardholder/user, while in other embodiments, the account number is a predefined or static number provided by the merchant to the directory server. In either embodiment, the directory server checks the enrollment status of the account number against a list of enrolled account numbers (e.g., to determine whether the account number is enrolled in a secure transaction processing program and/or a cardholder authentication program), and returns a verify enrollment response (VERes) message to the MPI device indicating the status of the enrollment of the account number. For example, if the account number is included in the list of enrolled account numbers, the directory server transmits a VERes message with a positive (e.g., true or "yes") response indicating that cardholder authentication is available for the current financial transaction. If the account number is not included in the list of enrolled account numbers, the directory server transmits a VERes message with a negative (e.g., false or "no") response.

After the MPI device has received a VERes message with a positive response, the MPI device generates a purchase authentication request (PAReq) message and transmits the PAReq message to the interchange computer system. For example, the MPI device may transmit the PAReq message to an access control server (ACS) of the interchange computer system. The PAReq message may include transaction information, such as, without limitation, the account number, a merchant name, a transaction amount, and/or item purchase information.

Upon receipt of the PAReq message, the interchange computer system generates a one-time password (OTP) and transmits the OTP to the cardholder via a communication medium that is different from the communication medium used to initiate the financial transaction. For example, the OTP may be transmitted as a short message service (SMS) message. The interchange computer system also prompts the cardholder to enter access credential information, including the OTP. The access credential information may also include, without limitation, a user name, a predefined and/or permanent password, a security token, and/or biometric data.

In one embodiment, the interchange computer system receives a request that originates at the client computer device and is forwarded to the interchange computer system by the MPI device. In another embodiment, the MPI device refers the client computer device to an address (e.g., a uniform resource indicator (URI)) associated with the interchange computer system, and the interchange computer system receives a request directly from the client computer device. In either embodiment, the interchange computer system prompts the cardholder for credential access information by providing a user interface to the client computer device.

The cardholder enters the access credential information, including the OTP, and the interchange computer system receives the access credential information from the client computer device. The interchange computer system verifies the access credential information. If the verification succeeds (e.g., the access credential information matches access credential information stored by and/or calculated by the interchange computer system), the interchange computer system prompts the cardholder for payment information for the current transaction. In an exemplary embodiment, the interchange computer system verifies the access credential information at least in part by determining whether the entered OTP is equal to the generated OTP.

When the entered access credential information is successfully verified, the interchange computer system generates a positive purchase authentication response (PARes) message and transmits the PARes message to the MPI device. The positive PARes message indicates a successful authentication of the identity of the cardholder.

The MPI device receives the positive PARes message from the interchange computer system. At this point, the transaction may be processed according to known methods to complete the purchase. For example, the interchange computer system may transmit transaction information to a merchant bank and/or an issuer bank associated with the transaction.

A technical effect of the systems and methods described herein includes at least one of a) a cardholder initiates a transaction using a client computer device, b) a merchant computer device transmits a verify enrollment request, c) receiving, at an interchange computer, the verify enrollment request including an account number, wherein the verify enrollment request is transmitted over a first communication medium, d) determining whether cardholder authentication is available for the account number, e) transmitting, by the interchange computer, a verify enrollment response indicating that cardholder authentication is available, f) receiving a purchase authentication request message from the merchant at the interchange computer system, the purchase authentication request message associated with the cardholder and the financial transaction, g) generating a one-time password for the financial transaction at the interchange computer system, h) storing the OTP in a database coupled to the interchange computer system, i) transmitting the one-time password to the cardholder via a second communication medium that is different from the first communication medium, j) prompting the cardholder to enter the one-time password into the client computer device, and k) based at least in part on determining that the entered one-time password is equal to the generated one-time password, transmitting a positive purchase authentication response message indicating a successful authentication of an identity of the cardholder from the interchange computer system to the merchant.

In one embodiment, a computer program is provided, and the program is embodied on a computer readable medium and utilizes Structured Query Language (SQL) to create, retrieve, update, and/or delete data within a database. For example, SQL may be used with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T, New York, N.Y.). The application is flexible and designed to run in various different environments without compromising any major functionality.

The systems and processes are not limited to the specific embodiments described herein. In addition, components of each system and each process can be practiced independent of and separate from other components and processes described herein. Each component and process also can be used in combination with other assembly packages and processes.

FIG. 1 illustrates a known multi-party transaction card industry system 20 for enabling ordinary payment-by-card transactions in which a merchant 24 and an issuer 30 do not need to have a one-to-one special relationship. A financial institution 30 called the "issuer" provides a card, such as a credit card, to a cardholder 22, who uses the card to tender payment for a purchase from a merchant 24. To accept payment with the card, merchant 24 must normally establish an account with a financial institution 26 called the "merchant bank," "acquiring bank," or "acquirer bank." When cardholder 22 tenders payment for a purchase with a card, merchant 24 requests authorization from merchant bank 26 for the amount of the purchase. The request may be performed over the telephone, but is usually performed through the use of a point-of-sale terminal, which reads the cardholder's account information from the magnetic stripe or chip on the card and communicates electronically with the transaction processing computers of merchant bank 26. Alternatively, merchant bank 26 may authorize a third party called a "merchant processor," an "acquiring processor," or a "third party processor" to perform transaction processing on its behalf In this case, the point-of-sale terminal will be configured to communicate with the third party. A point-of-sale terminal may include without, limitation, a computer system operated by a merchant and/or by a cardholder.

Using an interchange computer system that is associated with a interchange network 28, the computers of merchant bank 26 communicate with the computers of issuer bank 30 to determine whether a cardholder's account 32 is in good standing and whether the purchase is covered by the consumer's available credit line. Based on these determinations, the request for authorization will be declined or accepted. If the request is accepted, an authorization code is issued to merchant 24 and an available credit line of cardholder's account 32 is decreased.

Normally, a charge for a credit transaction is not posted immediately to cardholder's account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated.

After a transaction is captured, the transaction is settled between merchant 24, merchant bank 26, interchange network 28, and issuer 30. Settlement refers to the transfer of financial data or funds between merchant 24, merchant bank 26, interchange network 28, and issuer 30 related to the transaction. Usually, transactions are captured and accumulated into a "batch," which are settled as a group. More specifically, a transaction is typically settled between issuer 30 and interchange network 28, and then between interchange network 28 and merchant bank 26, and then between merchant bank 26 and merchant 24.

Financial transaction cards or payment cards can refer to credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile telephones, personal digital assistants (PDAs), and key fobs.

Figure 2:
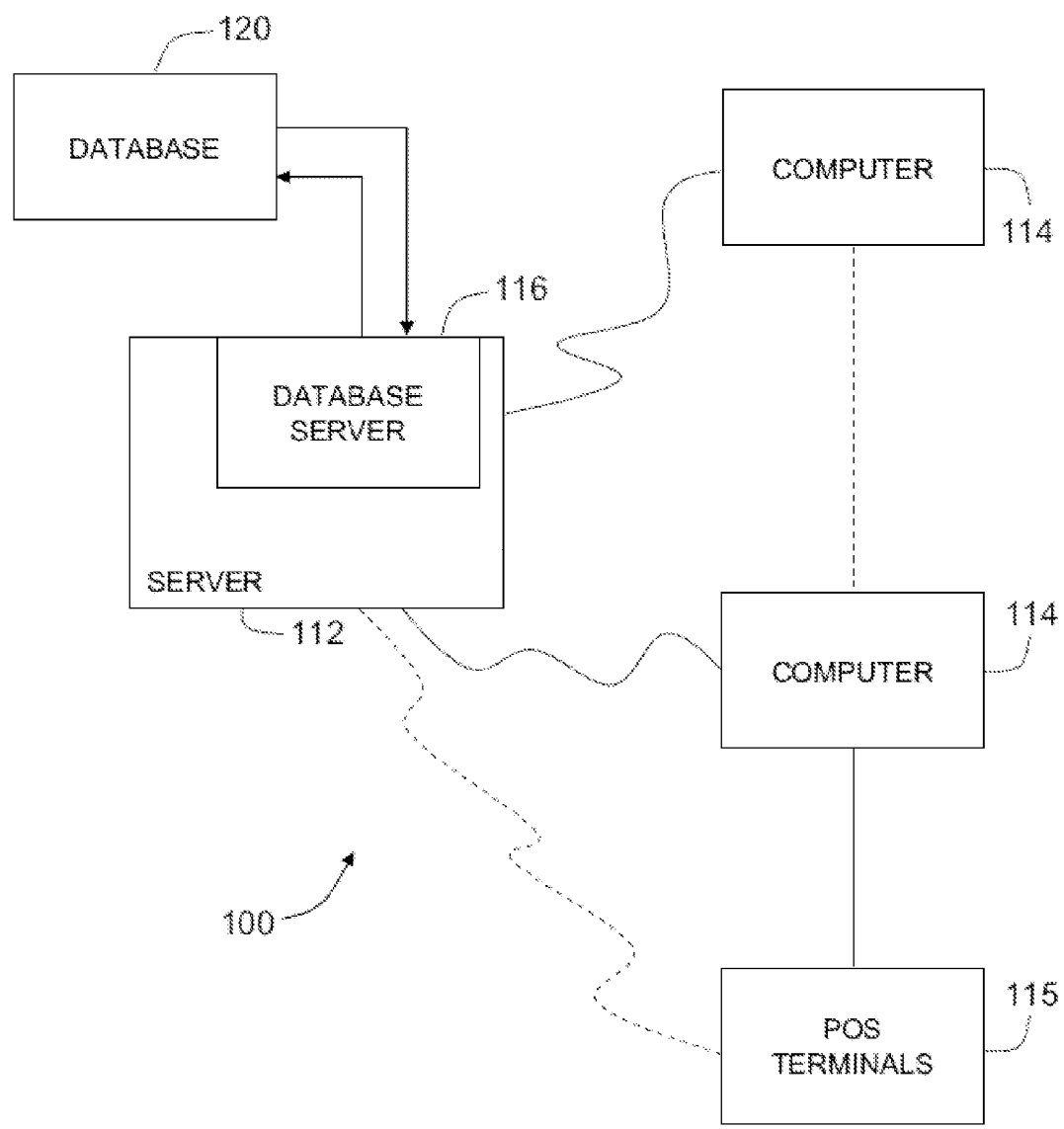
FIG. 2 is a simplified block diagram of a typical server architecture of a system that facilitates authenticating an identity of a customer in accordance with the present invention.

FIG. 2 is a simplified block diagram of an exemplary system 100 in accordance with one embodiment of the present invention. In the exemplary embodiment, system 100 facilitates ensuring that a person attempting to use a transaction card or its corresponding account numbers is the legitimate cardholder. More specifically, in the exemplary embodiment, system 100 includes a server system 112 communicatively coupled to a plurality of client systems 114, which may include one or more input devices (shown in FIG. 4). Server system 112 may also be referred to as an interchange computer system.

In the exemplary embodiment, client systems 114 are computers that include a web browser, which enable client systems 114 to access server system 112 using the Internet. More specifically, client systems 114 are communicatively coupled to the Internet through many interfaces including, but not limited to, at least one of a network, such as the Internet, a local area network (LAN), a wide area network (WAN), and/or an integrated services digital network (ISDN), a dial-up-connection, a digital subscriber line (DSL), and a cable modem. Client systems 114 can be any device capable of accessing the Internet including, but not limited to, a desktop computer, a laptop computer, a personal digital assistant (PDA), or other web-based connectable equipment.

System 100 also includes point of sale (POS) terminals 115, which are connected to client systems 114 and may be connected to server system 112. POS terminals 115 are interconnected to the Internet through many interfaces including a network, such as a local area network (LAN) or a wide area network (WAN), dial-in-connections, cable modems, wireless modems, and special high-speed ISDN lines. POS terminals 115 could be any device capable of interconnecting to the Internet and including an input device capable of reading information from a consumer's financial transaction card. Alternatively, or in addition, POS terminals 115 may include merchant computer systems that interact with a remote user, such as through a merchant website.

A database server 116 is communicatively coupled to a database 120 that contains a variety of information including, but not limited to, a name of a cardholder, an account number, a transaction history, an item purchase history, a billing address, a shipping address, the cardholder's date of birth, telephone number(s) associated with the cardholder (e.g., a mobile, home, or fax telephone number), email addresses associated with the cardholder, and other cardholder-related information. Moreover, the database 120 can include multiple account numbers for an account holder. In addition, each particular account number can have its own corresponding set of information specific for the particular account number. For example, different account numbers can have different shipping addresses associated therewith. In the exemplary embodiment, database 120 is stored remotely from server system 112. In an alternate embodiment, database 120 is decentralized. In the exemplary embodiment, a person can access database 120 via client systems 114 by logging onto server system 112.

The database 120 also includes information relating to the authentication protocol described above. According to some embodiments, the authentication protocols may be referred to as Three Domain Protocol (3-D Secure®) (3-D Secure is a registered trademark of Visa International Service Association located in Foster City, Calif.) or MasterCard SecureCode® (MasterCard SecureCode is a registered trademark of MasterCard International Incorporated located in Purchase, N.Y.). The authentication protocol in these embodiments is utilized by other financial card companies as well. The authentication protocol defines a standard for utilizing authentication credentials (e.g., a user name and/or password) to verify the identity of a user of a financial card. The standard for utilizing authentication credentials includes, for example, procedures for establishing the credentials, procedures for requesting and verifying the veracity of the credentials, and standards for communicating the results of the verification of the credentials to the directory server (e.g., interchange network) and/or the issuing bank. Protocols in general are commonly recognized as a set of rules governing the format of messages that are exchanged between computers. For example, a protocol may be a specific set of rules, procedures, or conventions relating to format and timing of data transmission between two devices.

The content of the information included within messages described herein varies based on the type of communication being made. For the purposes of discussion herein, four types of communication are provided, although additional types of communication are contemplated as well.

In one embodiment, the four communication types include: a verify enrollment request (VEReq), a verify enrollment response (VERes), a purchase authentication request (PAReq), and a purchase authentication response (PARes). Specific examples of the use of the types of communication are discussed in greater detail below.

In the example embodiment, server system 112 may be associated with a interchange network, and may be referred to as an interchange computer system. Additionally, a check-out platform may be associated with the interchange network. Server system 112 may be used for processing transaction data and for registering cardholders into a plurality of programs offered by the interchange network. In addition, at least one of client systems 114 may include a computer system associated with an issuer of a transaction card. Accordingly, server system 112 and client systems 114 may be utilized to process transaction data relating to purchases made by a cardholder utilizing a transaction card that is processed by the interchange network and issued by the associated issuer. Another client system 114 may be associated with a user or a cardholder seeking to register, access information or process a transaction with at least one of the interchange network, the issuer, the POS, or the MPI device.

The embodiments illustrated and described herein as well as embodiments not specifically described herein but within the scope of aspects of the invention constitute exemplary means for performing a financial transaction, and more particularly, constitute exemplary means for authenticating a payer in a financial transaction using a one-time password. For example, the server system 112, POS terminal 115, or the client system 114, or any other similar computer device, programmed with computer-executable instructions to execute processes and techniques with a processor as described herein, constitutes exemplary means for authenticating a user of a financial transaction card according to an authentication protocol.

Figure 3:
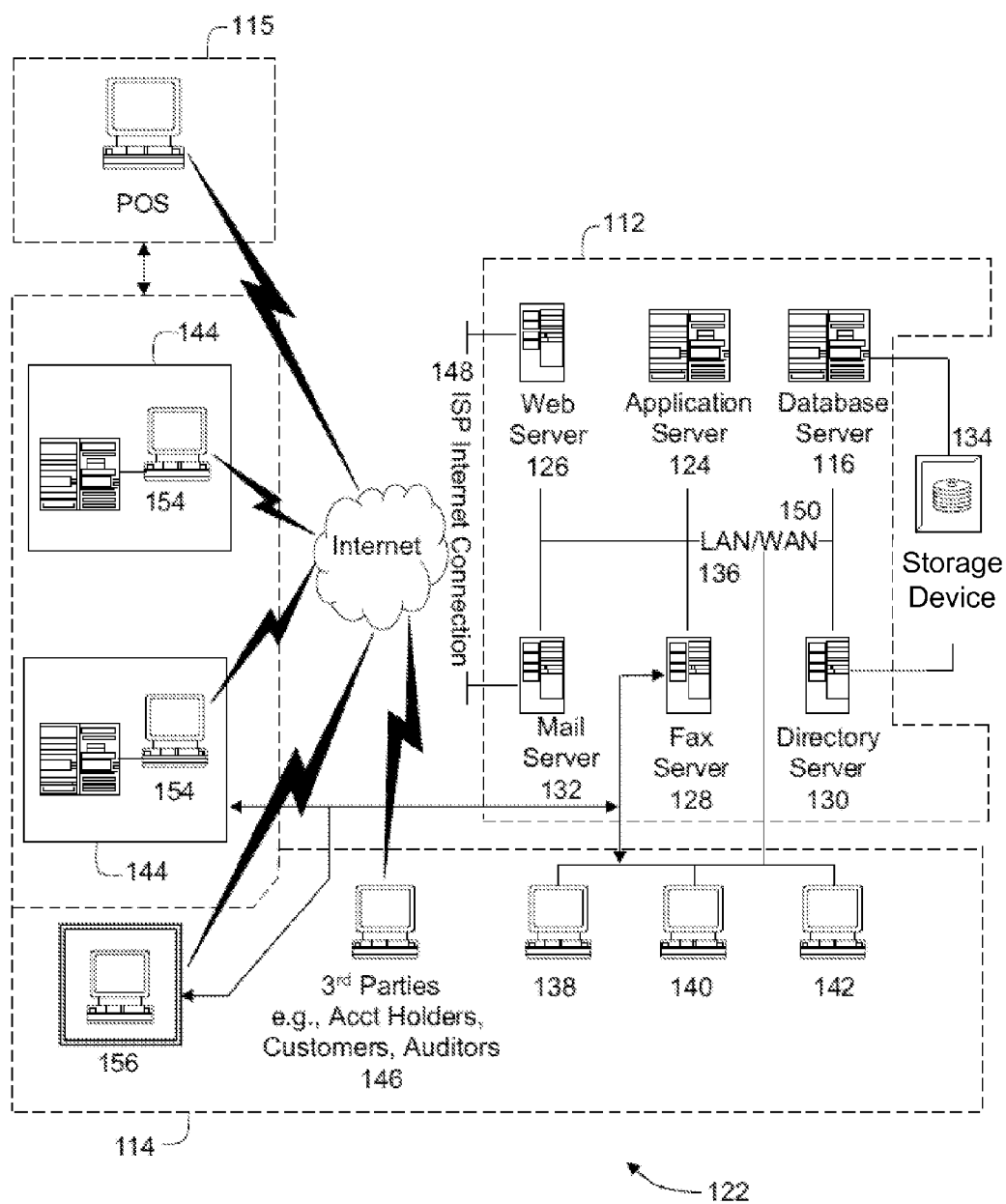
FIG. 3 is an expanded block diagram of the typical system shown in FIG. 2 in accordance with the present invention.

FIG. 3 is an expanded block diagram of an exemplary system 122 in accordance with one embodiment of the present invention. The components of system 122, which are identical to components of system 100 (shown in FIG. 2), are identified in FIG. 3 using the same reference numerals as used in FIG. 2. System 122 includes server system 112, client systems 114 and POS terminals 115. Server system 112 further includes database server 116, an application server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 146 using a telephone link. Fax server 128 is configured to communicate with other client systems 138, 140, and 142 as well.

As used herein, the terms "software" and "firmware" are interchangeable, and include any computer program stored in memory for execution by personal computers, workstations, clients and servers, including random access memory (RAM), read-only memory (ROM), erasable programmable ROM (EPROM), electrically erasable programmable ROM (EEPROM), and/or non-volatile RAM (NVRAM) memory.

The above memory types are exemplary only, and are thus not limiting as to the types of memory usable for storage of a computer program.

Figure 4:
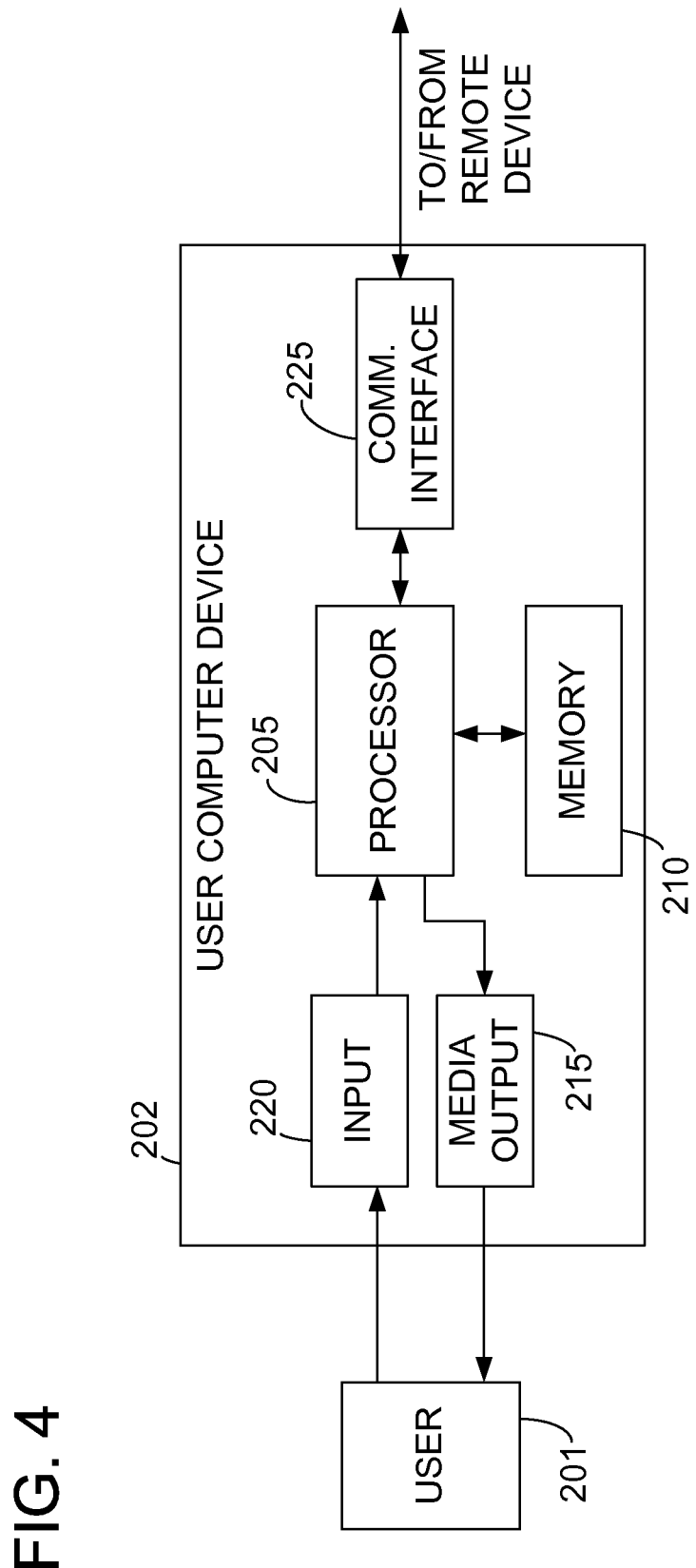
FIG. 4 illustrates an exemplary configuration of a user computer device for use with a client system shown in FIGS. 2 and 3.

FIG. 4 illustrates an exemplary configuration of a user computer device 202 operated by a user 201. User computer device 202 may include or be included in, but is not limited to, client systems 114, 138, 140, and 142, POS terminal 115, workstation 154, and manager workstation 156. Exemplary user computer devices 202 include personal computers (e.g., workstations and/or portable computers), kiosks, mobile telephones, electronic book readers, and/or digital media players.

User computer device 202 includes a processor 205 for executing instructions. In some embodiments, executable instructions are stored in a memory device 210. Processor 205 may include one or more processing units (e.g., in a multi-core configuration). Memory device 210 is any device allowing information such as executable instructions and/or transaction data to be stored and retrieved. Memory device 210 may include one or more computer readable media.

User computer device 202 also includes at least one media output component 215 for presenting information to user 201. Media output component 215 is any component capable of conveying information to user 201. In some embodiments, media output component 215 includes an output adapter (not shown) such as a video adapter and/or an audio adapter. An output adapter is operatively coupled to processor 205 and operatively couplable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 215 is configured to present a graphical user interface (e.g., a web browser and/or a client application) to user 201. A graphical user interface may include, for example, an online store interface for viewing and/or purchasing items, and/or a wallet application for managing payment information.

In some embodiments, user computer device 202 includes an input device 220 for receiving input from user 201. User 201 may use input device 220 to select and/or enter, without limitation, one or more items to purchase, a purchase request, access credential information, and/or payment information. Input device 220 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 215 and input device 220.

User computer device 202 may also include a communication interface 225, which is communicatively couplable to a remote device such as server system 112. Communication interface 225 may include, for example, a wired or wireless network adapter and/or a wireless data transceiver for use with a mobile telecommunications network.

Stored in memory device 210 are, for example, computer readable instructions for providing a user interface to user 201 via media output component 215 and, optionally, receiving and processing input from input device 220. A user interface may include, among other possibilities, a web browser and/or a client application. Web browsers enable users, such as user 201, to display and interact with media and other information typically embedded on a web page or a website from server system 112. A client application allows user 201 to interact with a server application of a merchant computer system, POS terminal 115, and/or server system 112.

Figure 5:
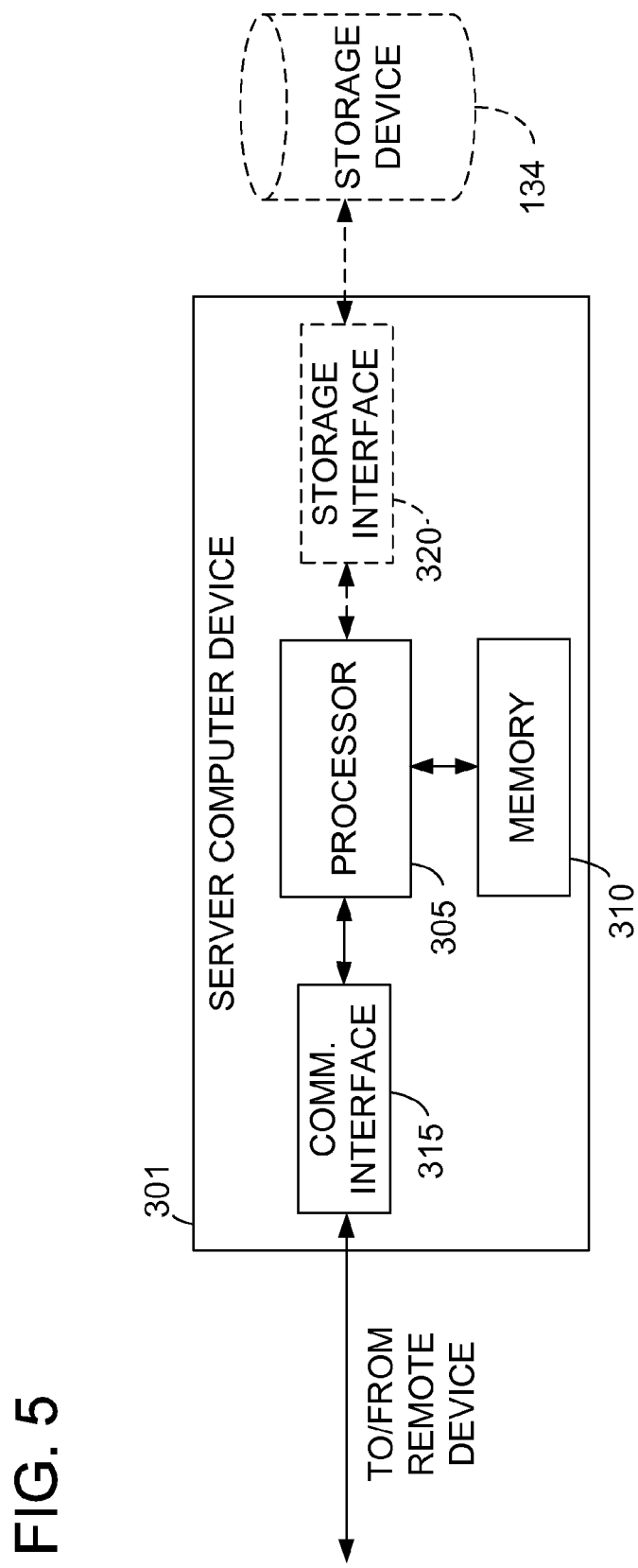
FIG. 5 illustrates an exemplary configuration of a server computer device for use with a server system shown in FIGS. 2 and 3.

FIG. 5 illustrates an exemplary configuration of a server computer device 301, which may be included in server system 112 (shown in FIG. 2). Server computer device 301 may include, but is not limited to, a merchant computer system, POS terminal 115, database server 116, application server 124, web server 126, fax server 128, directory server 130, and/or mail server 132.

Server computer device 301 also includes a processor 305 for executing instructions. Instructions may be stored in a memory device 310, for example. Processor 305 may include one or more processing units (e.g., in a multi-core configuration). Memory device 310 may also include cardholder information (e.g., contact information), account information, authentication program enrollment information, access credential information, transaction information, and/or any other information relevant for processing and/or authentication of a financial transaction.

Processor 305 is operatively coupled to a communication interface 315 such that server computer device 301 is capable of communicating with a remote device such as user computer device 202 or another server computer device 301. For example, communication interface 315 may receive requests from client system 114 via the Internet, as illustrated in FIG. 3.

Processor 305 may also be operatively coupled to a storage device 134. Storage device 134 is any computer-operated hardware suitable for storing and/or retrieving data, such as, but not limited to, data associated with database 120. In some embodiments, storage device 134 is integrated in server computer device 301. For example, server computer device 301 may include one or more hard disk drives as storage device 134. In other embodiments, storage device 134 is external to server computer device 301 and may be accessed by a plurality of server computer devices 301. For example, storage device 134 may include multiple storage units such as hard disks and/or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Computer devices such as user computer device 202 and server computer device 301 may be grouped together in a computer system. For example, a computer system may be created by connecting a plurality of server computer devices 301 and/or user computer devices 202 to a single network. Alternatively, one or more computer devices operable by a single user may be considered a computer system.

Figure 6:
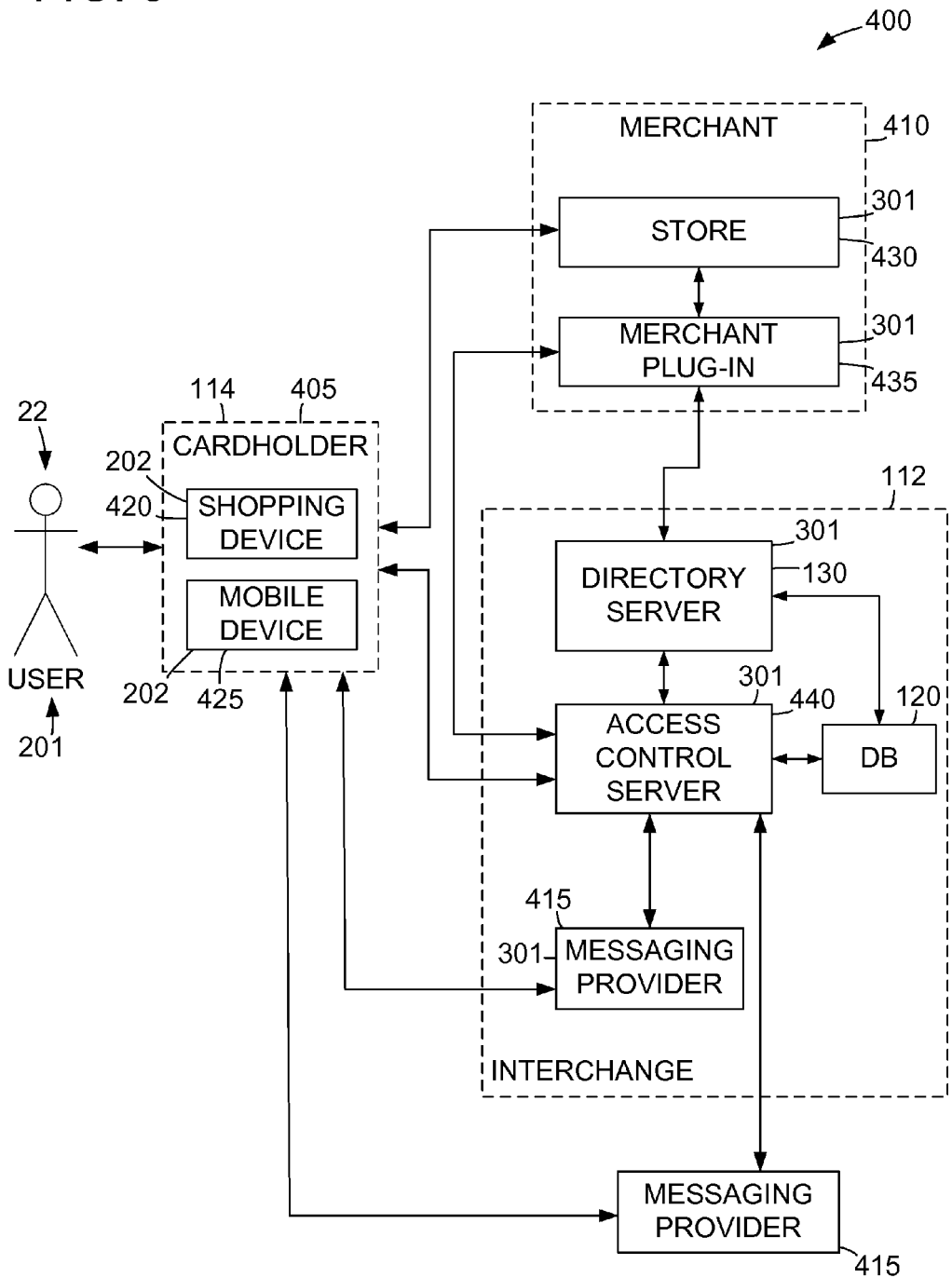
FIG. 6 is a block diagram of a system showing data flow between various computer devices for authenticating the identity of a user in accordance with the present invention.

FIG. 6 is a block diagram of an exemplary system 400 showing data flow between various computer devices for authenticating the identity of a user. Specifically, the system 400 includes a cardholder computer system 405 associated with a cardholder 22, a merchant computer system 410 operated by a merchant, an interchange computer system 112 operated by an interchange network, and a messaging provider system 415. As shown in FIG. 6, messaging provider system 415 may be operated by an outside party or may be one or more server computer devices 301 within computer system 112 of the interchange network. The cardholder 22, acting as a user 201, interacts with one or more user computer devices 202 of the cardholder computer system 405. In the exemplary embodiment, the cardholder computer system 405 includes a shopping device 420 and a mobile device 425. However, the cardholder computer system 405 may include more or fewer computing devices 202. For example, the mobile device 425 may also serve as the shopping device 420. User computer devices 202 and server computer devices 301 within the system 400 may communicate with each other via communication interfaces 225, 315 (shown in FIGS. 4 and 5).

The merchant computer system includes a merchant store server 430 and a merchant plug-in (MPI) device 435. The interchange computer system 112 includes a directory server (DS) 130, an access control server (ACS) 440, and a database 120. The interchange computer system 112 may also include a messaging provider 415.

The cardholder 22 interacts with the merchant store server 430 via the shopping device 420. In some embodiments, the shopping device 420 communicates with the merchant store server 430 via the Internet (e.g., using a web browser and/or HTTP). For example, the shopping device 420 may request information about items (e.g., products and/or services) provided for purchase by the merchant and may further issue a purchase request for one or more items to the merchant store server 430.

The merchant computer system 410 and/or the MPI device 435 may host a website. For example, the merchant computer system 410 may host an electronic commerce website for selling goods and/or services via the Internet. The merchant plug-in device 435 may include an add-on software, hardware, or service-provided module that is communicatively coupled to the merchant computer system 410. For example, if the merchant plug-in device 435 is a software module, it may be stored in the memory device 310 (shown in FIG. 5) of the merchant computer system 410, while if it is a hardware or service-provided module it is communicatively coupled to the merchant computer system 410.

The MPI device 435 functions as an interface between the merchant computer system 410 and the directory server 130 and the access control server (ACS) 440. The MPI device 435 may be of the type used in known authentication protocol systems. The merchant computer system 410 and/or the MPI device 435 may have databases 120 (shown in FIG. 2) with information stored therein. A check-out procedure and/or a purchase request is initiated upon selection of a check-out option provided by the merchant store server 430 at the shopping device 420.

The directory server 130 is associated with the interchange network in the exemplary embodiment, and functions accordingly as described above. The directory server 130 operates in the same manner as the type used in known authentication protocol systems. While shown as separate in FIG. 6, the access control server 440, the directory server 130, and the database 120 may reside on any number of server computer devices 301, including a single server computer device 301, according to one embodiment. Alternatively, the access control server 440, the directory server 130, and/or the database 120 may be distributed across multiple server computer devices 301.

The database 120 contains cardholder information, account information, authentication program enrollment information, access credential information, transaction information, and/or any other information relevant for processing and/or authentication of a financial transaction. For example, the information can include the card account number, expiry date, CVC2 code, billing and/or shipping addresses, access credentials, and/or contact information, such as a telephone number (e.g., a work telephone number and/or a mobile telephone number), an email address, and/or a user identifier for an online chat service. The information may be populated in the database 120 by retrieval from within the interchange computer system 112 or it may be supplied by the user 201. For example, the access control server 440 may provide to the cardholder computer system 405 a card management interface that enables the cardholder 22 to define and manage transaction card information for each of a plurality of transaction cards and contact information associated with the cardholder 22. As shown in FIG. 6, the access control server 440 may transmit and receive information to and from the directory server 130 and/or the MPI device 435.

Figure 7:
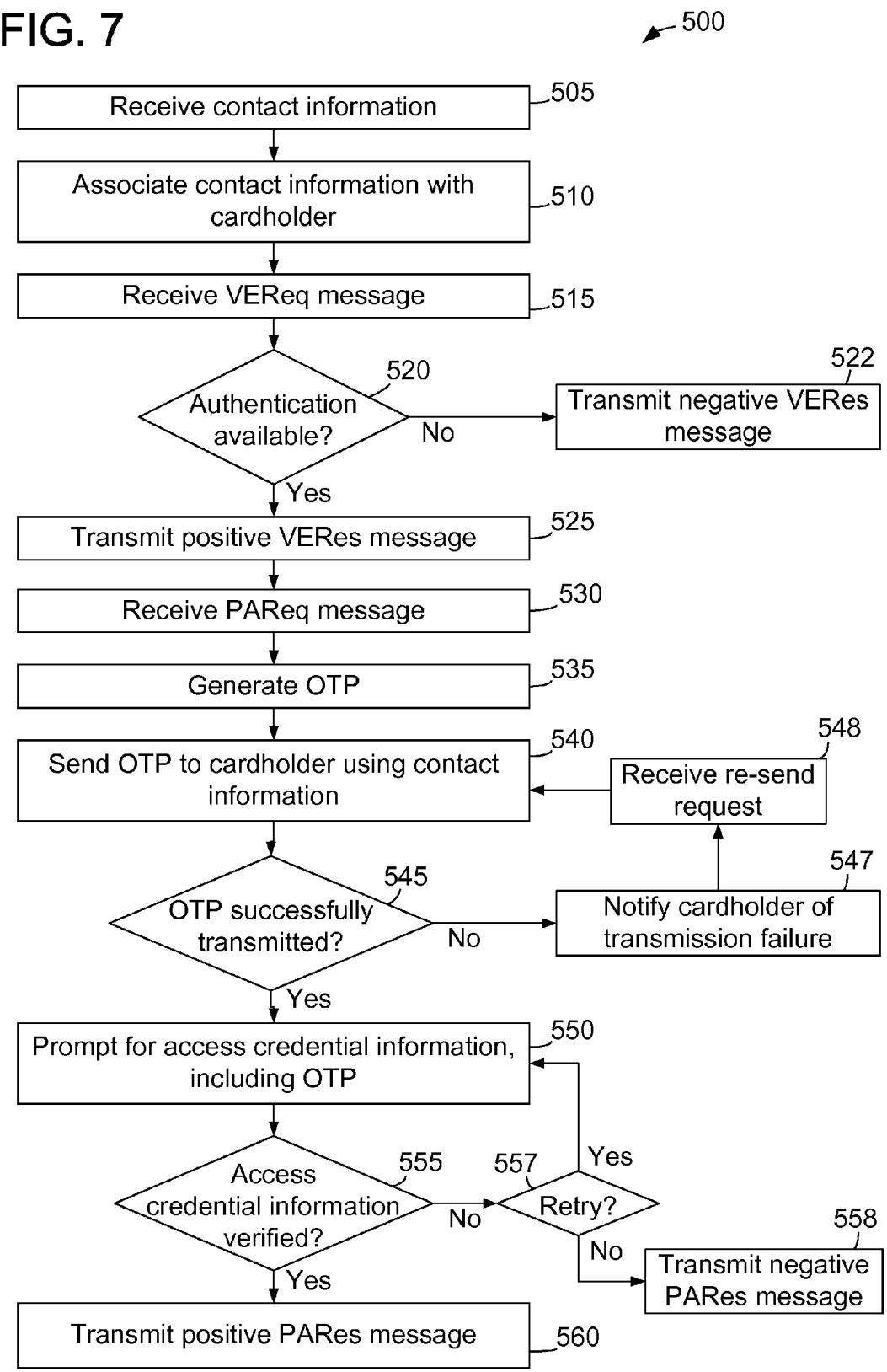
FIG. 7 is a flowchart illustrating an exemplary process for authenticating the identity of a cardholder in accordance with the present invention.
Figure 8:
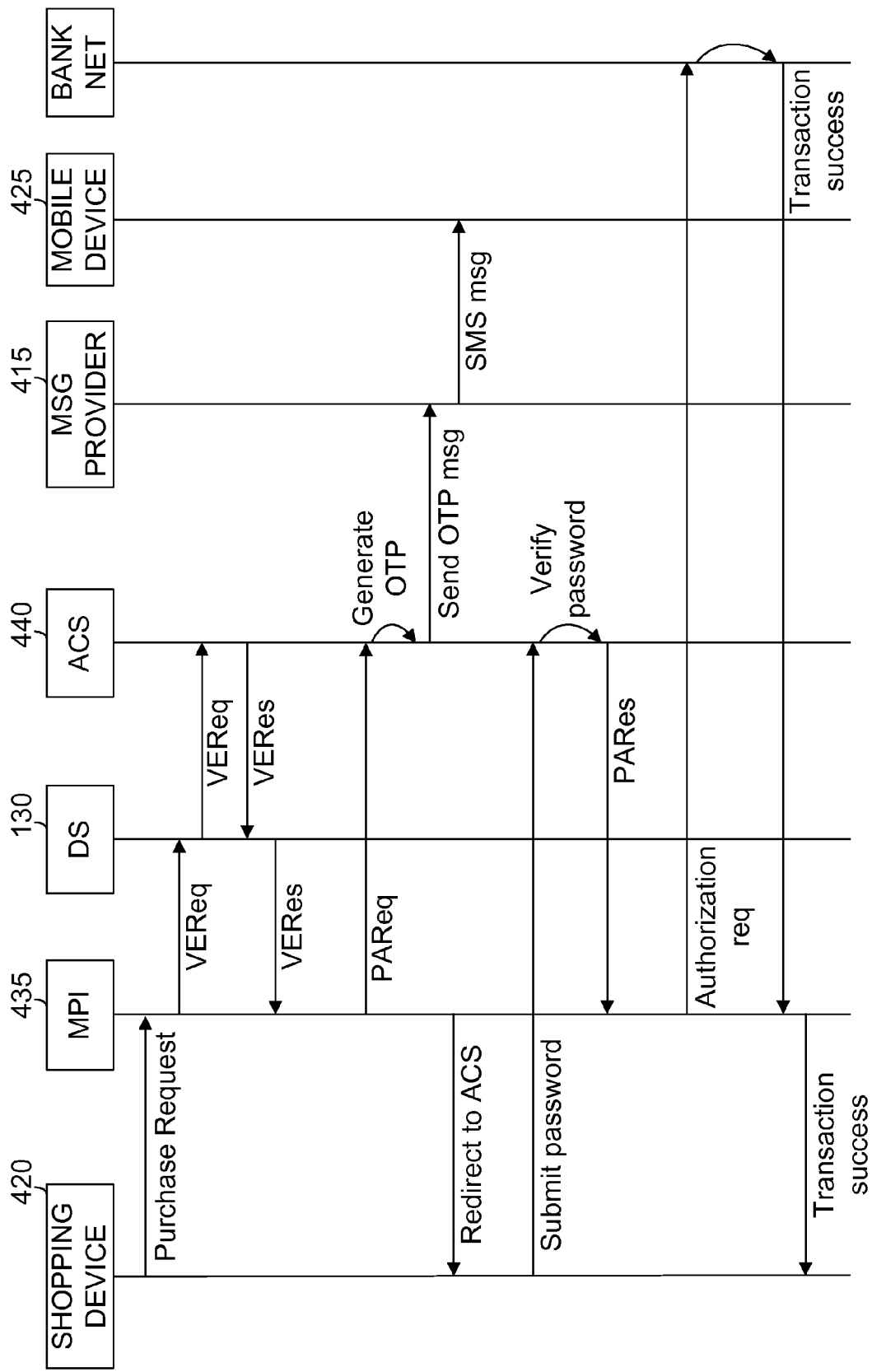
FIG. 8 is a diagram illustrating a sequence of interactions between computer devices in accordance with the flowchart shown in FIG. 7.

FIG. 7 is a flowchart 500 illustrating an exemplary process for authenticating the identity of a cardholder. The process described below with regard to flowchart 500 may be further understood with reference to FIG. 8, a diagram illustrating a sequence of interactions between computer devices in one embodiment.

In the process illustrated by flowchart 500, prior to the item purchase process, interchange computer system 112 (e.g., the access control server) receives 505 contact information, such as a mobile telephone number and/or an email address, for the cardholder. For example, the contact information may be received 505 from the cardholder computer system and/or from a computer system associated with the cardholder's issuing bank. Interchange computer system 112 associates 510 the contact information with the cardholder in the database.

The cardholder subsequently accesses the merchant computer system to identity one or more items to purchase. The cardholder finishes selecting items to purchase and initiates the check-out procedure by selecting a check-out option provided by the merchant computer system. The cardholder device (e.g., shopping device 420) transmits a purchase request to the merchant store server, initiating a financial transaction. The merchant store server notifies the MPI device of the purchase request. In response, a verify enrollment request (VEReq) message is transmitted by the MPI device. The verify enrollment request is received 515 by the directory server, which is associated with interchange computer system 112, from the MPI device. In operation, when a cardholder indicates an intention to use a check-out option, the MPI device is utilized by the merchant to communicate an account number associated with the user to the directory server.

The directory server determines 520, by itself or by forwarding the VEReq message to the access control server, whether cardholder authentication is available for the corresponding account number. In embodiments where a static number is utilized, a corresponding static number is maintained in a database on the directory server. In embodiments utilizing a user-specific account number, the account number provided by the MPI device is compared to a collection of account numbers stored within the interchange computer system database of enrolled user-specific account numbers. The collection of enrolled account numbers in the database is either populated when a user enrolls their specific account in the authentication program or, in the case of static numbers, the list is populated by the merchant, the directory server, and/or the authentication control server.

If the account number is not verified (e.g., the account number is not included in the collection of enrolled account numbers), a negative verify enrollment response (VERes) message is transmitted 522 to the MPI device by the directory server. The MPI device may continue processing the transaction without authentication or may terminate processing of the transaction. If the account number is verified, the directory server transmits 525 a positive VERes message to the MPI device. The positive VERes message indicates that authentication is available for the financial transaction.

When the positive VERes message has been received by the MPI, the merchant computer system (e.g., the MPI device) transmits a purchase authentication request (PAReq) message to the access control server. The PAReq message is associated with the cardholder and the financial transaction.

The access control server (ACS) 440 receives 530 the PAReq message. In response to the PAReq message, interchange computer system 112 generates 535 a one-time password (OTP) for the financial transaction. Specifically, the ACS 440 generates the OTP at least in part by generating a sequence of random characters. The ACS transmits 540 the one-time password to the cardholder via the messaging provider 415 using contact information associated with the cardholder in the database. In the exemplary embodiment, the one-time password is transmitted to the cardholder via a communication medium that is different from the communication medium used by the cardholder to initiate the transaction with the merchant. For example, the cardholder may submit a purchase request to the merchant via the Internet (e.g., using a web browser and/or HTTP), and the one-time password may be transmitted to a mobile device associated with the cardholder via a short message service (SMS) message.

In one embodiment, the contact information in the database includes a mobile telephone number associated with the cardholder, and the access control system transmits an SMS message transmission request to the messaging provider, including the one-time password and the mobile telephone number. In response, the messaging provider transmits the one-time password to the mobile telephone number as an SMS message. In one embodiment, the one-time password includes the mobile telephone number associated with the cardholder.

The one-time password may be transmitted as text within an SMS message, an email message, and/or any other suitable communication medium. In an alternative embodiment, the one-time password is rendered within an image and transmitted as a multimedia messaging service (MMS) message, an email, and/or any other communication medium suitable for transmitting image data. The image may include the one-time password in a visually distorted form, such as used in a CAPTCHA scheme. Such an embodiment facilitates preventing automated, computer-based interception of the one-time password.

In some embodiments, interchange computer system 112 may determine 545 whether the one-time password was successfully transmitted to the cardholder. For example, interchange computer system 112 (e.g., the token verification system) may be programmed to receive and/or to poll for a confirmation or a failure notification from the messaging provider. In an exemplary embodiment, interchange computer system 112 determines 545 whether an SMS message was delivered to the mobile device associated with mobile telephone number of the cardholder. If the one-time password is not successfully delivered to the cardholder, interchange computer system 112 notifies 547 the cardholder of the delivery failure, presenting a re-send option to the cardholder to indicate that the one-time password should be resent. When a re-send request is received 548 from the cardholder, the one-time password is again transmitted 540 to the cardholder using the contact information.

In addition to the one-time password, interchange computer system 112 may provide data representing the transaction to the cardholder via the communication medium used to send the one-time password. For example, the data representing the transaction may include, without limitation, an identifier of the transaction (e.g., a transaction number), the amount of the transaction, the name of the merchant, and a portion of an account number (e.g., the last four digits) associated with the cardholder. Such data may be extracted from the VEReq message, the PAReq message, and/or from the database. Providing such data notifies the cardholder that a purchase is being attempted with the cardholder's account and enables the cardholder to confirm that the one-time password being used has been generated for a transaction that the cardholder has initiated. The one-time password and the transaction data may be transmitted in a single transmission or separately.

Interchange computer system 112 (e.g., the access control server) prompts 550 the cardholder to enter access credential information, including the one-time password. The cardholder receives the one-time password at the mobile device and enters the one-time password at the cardholder device (e.g., shopping device 420). In addition, interchange computer system 112 may prompt 550 the user to enter other access credential information, such as a user name, a predefined and/or permanent password, a security token, and/or biometric data (e.g., a fingerprint).

Interchange computer system 112 (e.g., the access control server) verifies 555 the access credential information provided by the cardholder. If the verification fails, interchange computer system 112 determines 557 whether to retry verification. For example, interchange computer system 112 may be configured to perform a predefined quantity (e.g., three or five) of retries. If interchange computer system 112 determines 557 an authentication retry is allowed, the cardholder is again prompted 550 to enter access credential information, including the OTP, and interchange computer system 112 again verifies 555 the entered access credential information. If interchange computer system 112 determines 557 an authentication retry is not allowed, interchange computer system 112 transmits 558 a negative purchase authentication response (PARes) message to the merchant computer system indicating that the authentication failed.

When the verification succeeds, interchange computer system 112 transmits 560 a positive purchase authentication response (PARes) message indicating that the identity of the cardholder has been successfully verified to the merchant computer system. The positive PARes message sent by the access control server may further indicate that the merchant is approved to proceed with processing and/or executing the financial transaction. For example, based on the positive PARes message, the merchant computer system may transmit an authorization request for the financial transaction to another computer device such as one associated with the issuer bank.

In one embodiment, prompting 550 the cardholder to enter access credential information includes requesting the cardholder to reply to the one-time password message via the communication medium used to send the one-time password. For example, if the one-time password was sent to the cardholder as an SMS message, the cardholder is prompted to reply to the SMS message. The cardholder may be further requested to include a token (e.g., a predefined password or another one-time password provided by interchange computer system 112) in the reply. In such an embodiment, verifying 555 the access credential information includes verifying that a reply was received from the cardholder via the communication medium used to transmit the one-time password.

Figure 9:
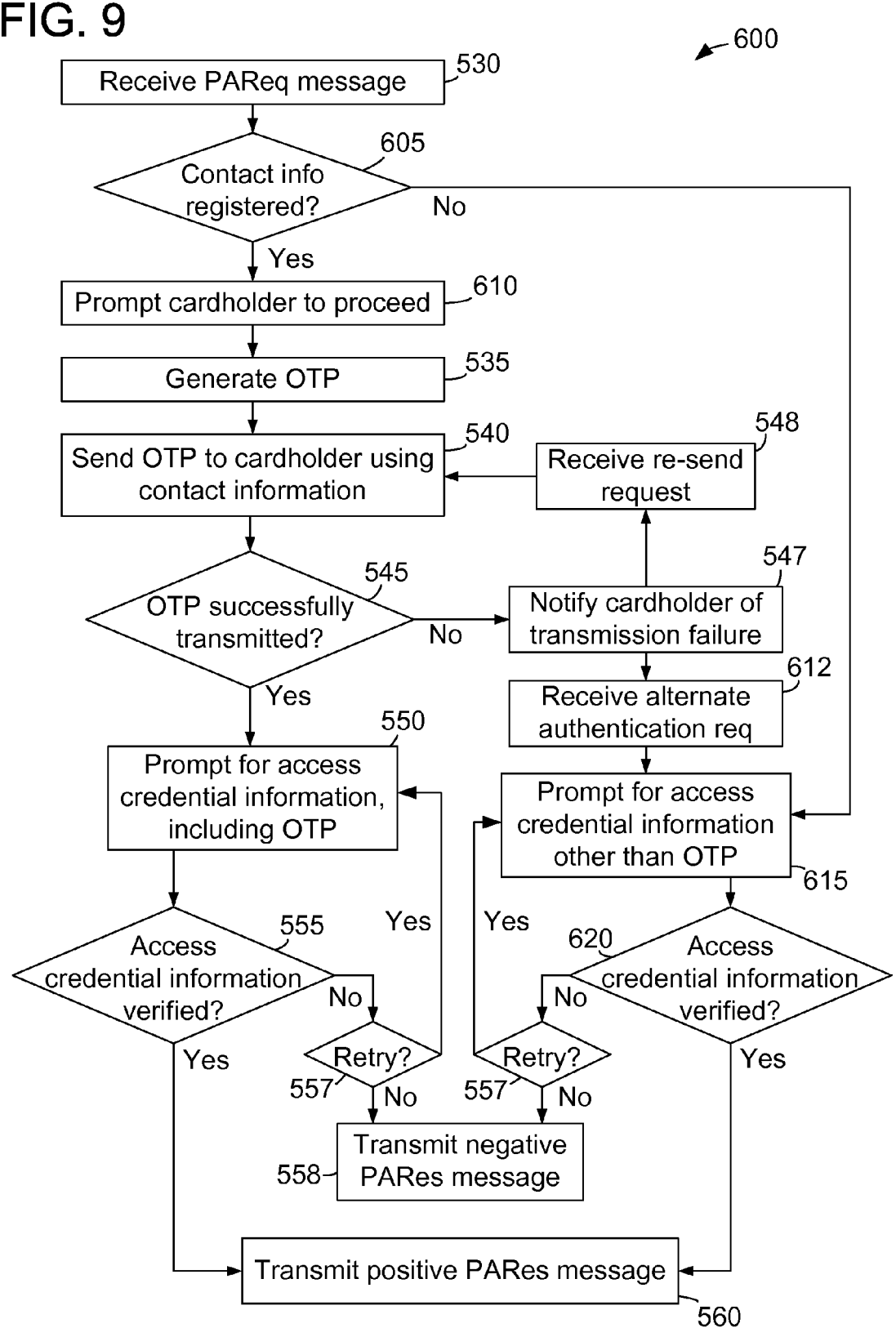
FIG. 9 is a flowchart illustrating the exemplary embodiment shown in FIG. 7 with an additional authentication subroutine for securely processing a financial transaction even when an exceptional scenario is encountered.

FIG. 9 is a flowchart 600 illustrating the exemplary embodiment shown in FIG. 7 with an additional authentication subroutine for securely processing the financial transaction even when an exceptional scenario is encountered. For example, such exceptional scenarios may occur when contact information for a cardholder is unavailable and/or when a one-time password (OTP) cannot be delivered to the cardholder using such contact information.

Flowchart 600 illustrates the process beginning as interchange computer system 112 receives 530 a PAReq message, as shown in FIG. 7. Other operations shown in FIG. 7 (e.g., receiving 515 a VEReq message) may also be performed prior to receiving 530 the PAReq message.

Interchange system 112 determines 605 whether contact information is registered and/or available for the cardholder associated with the PAReq message. If contact information is registered, interchange computer system 112 prompts 610 the cardholder to proceed. In some embodiments, the prompt is presented to the user via the MPI device 435 and/or the merchant store server 430. Prompting 610 the cardholder to proceed may include providing a message explaining that a one-time password will be delivered to the cardholder using the registered contact information. The cardholder may be further prompted to select a preferred language. Prompts to the cardholder and/or the message including the one-time password may be generated in the preferred language. When the cardholder elects to proceed (e.g., selects a continue button), interchange computer system 112 generates 535 an OTP, sends 540 the OTP to the cardholder using the contact information, and determines 545 whether the OTP was successfully transmitted, as described above with regard to flowchart 500 (shown in FIG. 7).

If interchange computer system 112 determines 605 that no contact information is registered and/or available for the cardholder, interchange computer system 112 prompts 615 (e.g., via the MPI device 435 and/or the merchant store server 430) the cardholder to enter access credential information other than an OTP. For example, the cardholder may be prompted 615 to enter shipping and/or billing address information associated with an account of the cardholder and/or an answer to one or more preconfigured security questions. Security questions may include, without limitation, a mother maiden name, a city of birth, and/or a name of a pet. The entered access credential information is verified 620. If the verification fails, interchange computer system 112 transmits 558 a negative PARes message to the merchant computer system. In some embodiments, as with verifying 555 an OTP, interchange computer system 112 may determine 557 whether an authentication retry is allowed if the verification fails. If the verification succeeds, a positive PARes message is transmitted 560 to the merchant computer system.

The embodiment shown in FIG. 9 also uses access credentials other than an OTP when interchange computer system 112 determines 545 that an OTP has not been successfully transmitted. In notifying 547 the cardholder of the transmission failure, interchange computer system 112 also includes an option to perform alternative authentication (i.e., without the use of the OTP). When interchange computer system 112 receives 612 an alternative authentication request, interchange computer system 112 prompts 615 for access credential information other than the OTP and verifies 620 the entered access credential information, as described above. Such embodiments facilitate securely processing a transaction in the event of a persistent failure in sending 540 the OTP to the cardholder. For example, such persistent failures may be caused by a communication failure between interchange computer system 112 and the messaging provider, an inoperable messaging provider, a communication failure between the messaging system and a mobile device, and/or an inoperable or lost mobile device.

In one embodiment, interchange computer system 112 associates an alternative authentication preference with the cardholder when the cardholder configures an account with interchange computer system 112. The alternative authentication preference indicates whether alternative authentication is allowed for the cardholder. If the preference indicates alternative authentication is not allowed, interchange computer system 112 will not present an option for alternative authentication when an OTP cannot be successfully transmitted.

Figure 10:
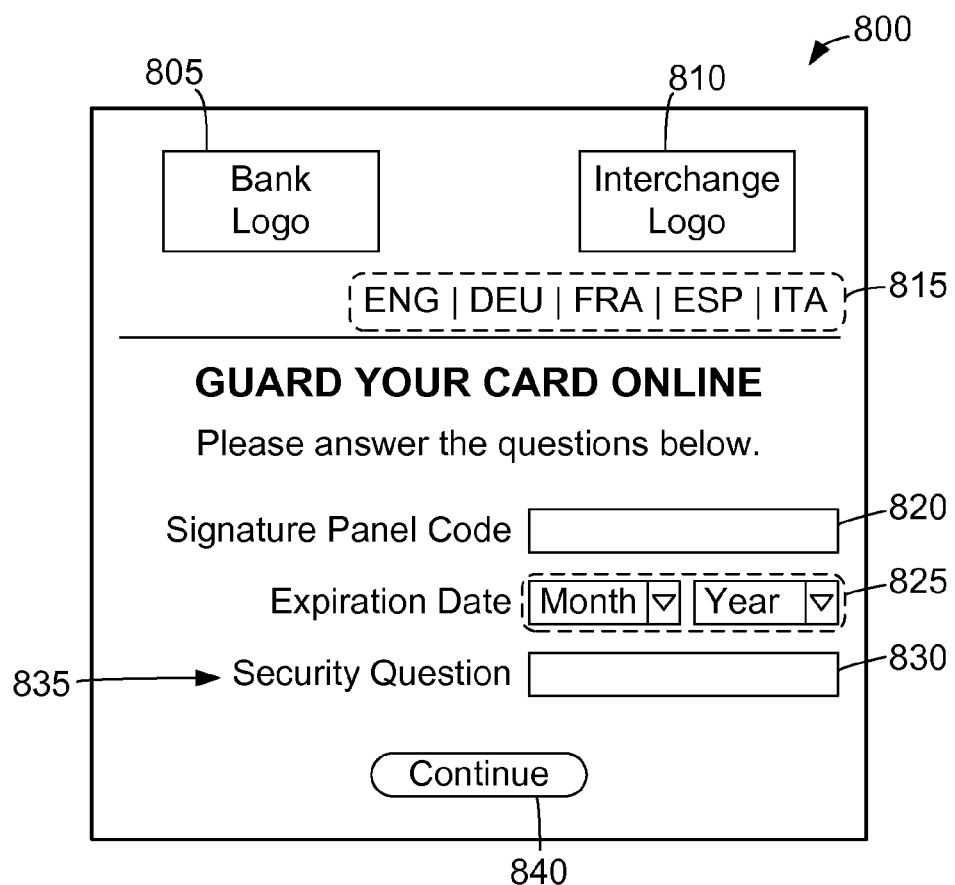
FIG. 10 is an exemplary user interface for authenticating a cardholder prior to associating contact information with the cardholder in accordance with the present invention.

FIG. 10 is an exemplary user interface 800 for authenticating a cardholder prior to associating contact information with the cardholder. In an exemplary embodiment, user interface 800 is presented to a cardholder by an interchange computer system (e.g., access control server 440, shown in FIG. 6) which has received an indication (e.g., a unique identifier) of the cardholder and/or a payment card associated with the cardholder (e.g., from a merchant computer system or an issuer).

User interface 800 includes a bank logo 805 and an interchange logo 810. Bank logo 805 is associated with the issuer of the cardholder's payment card. Interchange logo 810 is associated with the interchange network. A language selector 815 is configured to receive a selection of a preferred language from the cardholder. In response to the cardholder selecting a preferred language, the interchange computer system may redisplay user interface 800 in the preferred language. Alternatively, user interface 800 may redisplay its own contents in the preferred language in response to such a selection.

User interface 800 also includes a signature panel code input field 820, an expiration date selector 825, and a security question answer input field 830. Signature panel code input field 820 is configured to receive a string of characters indicating a code printed on the signature panel of the cardholder's payment card. For example, the signature panel code may be a card verification code (CVC) value. Expiration date selector 825 is configured to receive a date indicating the expiration date of the payment card. Security question answer input field 830 is configured to receive an answer to a preconfigured security question 835. For example, the cardholder may have previously configured a security question such as "What is your mother's maiden or family name?". The text of such a question may be displayed as preconfigured security question 835.

In an exemplary embodiment, the values entered into signature panel code input field 820, expiration date selector 825, and security question answer input field 830 are used by the interchange computer system authenticate the cardholder prior to associating contact information with the cardholder.

When the cardholder selects a continue button 840, the interchange computer system is configured to receive the values entered by the cardholder and to authenticate the cardholder based at least in part on the entered values. In one embodiment, the interchange computer system compares the entered values stored in a database (e.g., database 120). If the entered values match the stored values, the cardholder is authenticated, and the interchange computer system prompts the cardholder to enter contact information (e.g., in the user interface shown in FIG. 11). Otherwise, the interchange computer system may again present user interface 800 to the cardholder (e.g., for a predefined number of retries).

Figure 11:
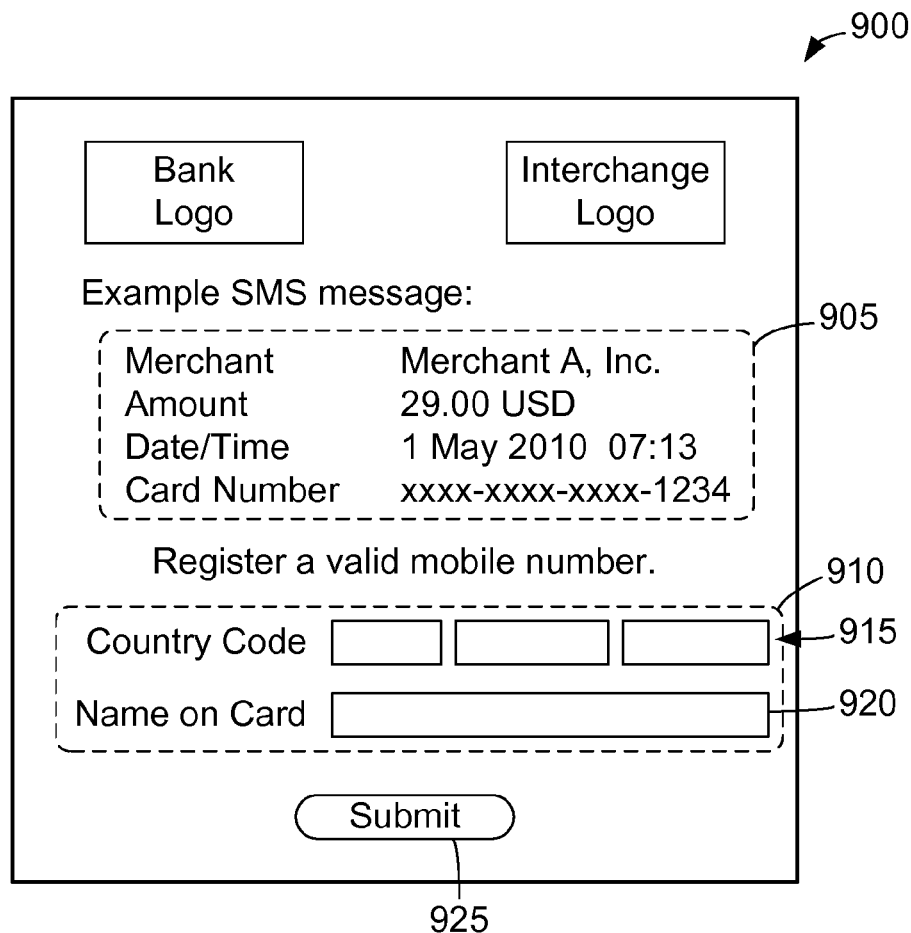
FIG. 11 is an exemplary user interface for associating contact information with a cardholder in accordance with the present invention.

FIG. 11 is an exemplary user interface 900 for associating contact information with a cardholder. User interface 900 includes a sample one-time password (OTP) message 905. Sample OTP message 905 is representative of a message the cardholder may receive when subsequently using OTP authentication in conjunction with a purchase transaction.

User interface 900 also includes a contact information entry portion 910. In an exemplary embodiment, contact information entry portion 910 includes a mobile telephone number input field 915, which is configured to receive a mobile telephone number corresponding to the cardholder. For example, the mobile telephone number may be associated with a mobile device owned and/or operated by the cardholder. Contact information entry portion 910 may also include, for example, a cardholder name input field 920.

When the cardholder selects a submit button 925, the interchange computer system is configured to receive the values entered by the cardholder and to associate the entered contact information with the cardholder in a database. In some embodiments, the interchange computer system may also be configured to, before associating the contact information with the cardholder, further authenticate the cardholder based at least in part on the entered values, such as a cardholder name entered in cardholder name input field 920. If the authentication succeeds, the contact information is associated with the cardholder. Otherwise, the interchange computer system may again present user interface 900 to the cardholder (e.g., for a predefined number of retries).

Figure 12:
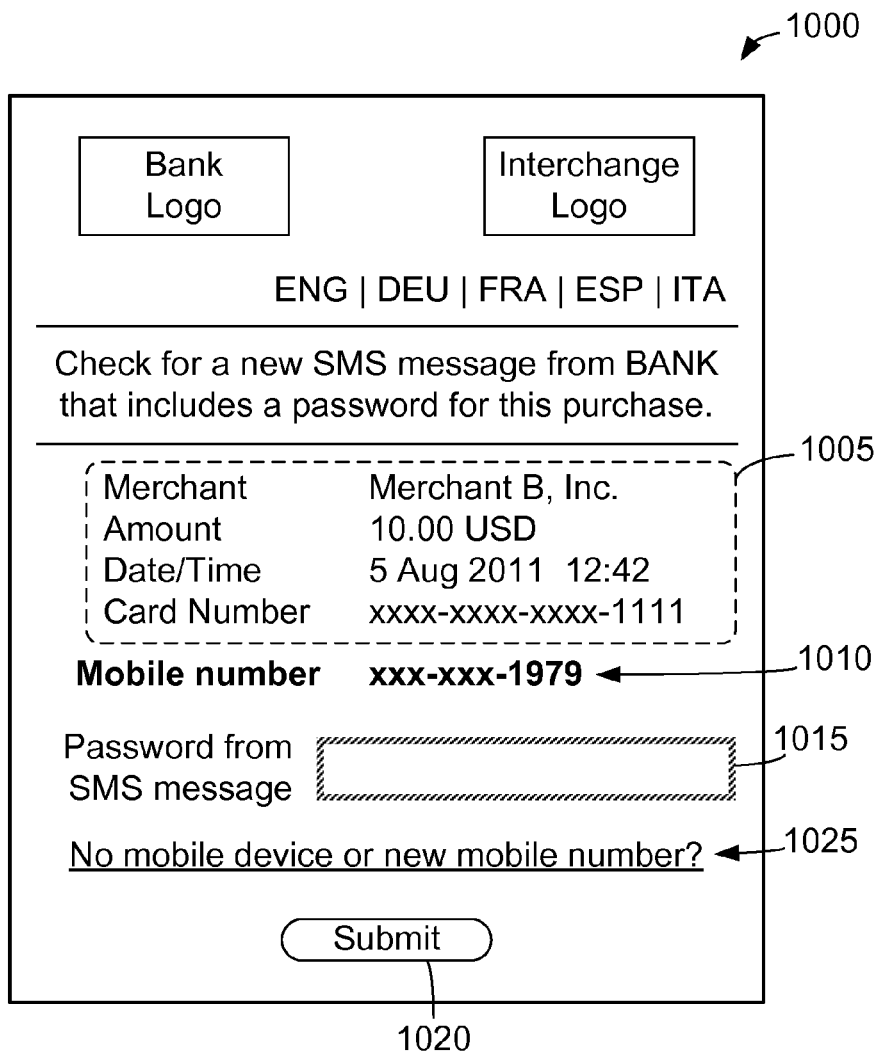
FIG. 12 is an exemplary user interface for receiving a one-time password (OTP) while processing a financial transaction in accordance with the present invention.

FIG. 12 is an exemplary user interface 1000 for receiving a one-time password (OTP) while processing a financial transaction. In an exemplary embodiment, user interface 1000 is presented to a cardholder by an interchange computer system to prompt the cardholder to enter an OTP.

User interface 1000 includes an OTP message portion 1005 representing an OTP message that was transmitted to the cardholder and a mobile telephone number indicator 1010. OTP message portion 1005 indicates one or more fields included in the OTP message, exclusive of the OTP itself, which enables the cardholder to identify the OTP corresponding to the current transaction. Such information may be especially useful, for example, if the cardholder engages in a plurality of transactions within a short amount of time (e.g., a one-minute, five-minute, or ten-minute duration). Mobile telephone number indicator 1020 indicates at least a portion (e.g., the last four digits) of a mobile telephone number to which the OTP message was transmitted.

User interface 1000 also includes an OTP input field 1015. OTP input field 1015 is configured to receive a password from the cardholder. In operation, the cardholder consults the mobile device associated with the mobile telephone number indicated by a mobile telephone number indicator 1010. Shortly after the cardholder initiates the financial transaction, the mobile device receives an OTP message from the interchange computer system (e.g., via a messaging provider). The OTP message includes an OTP and one or more fields representing and/or identifying the financial transaction, such as shown in OTP message portion 1005. The cardholder enters the included OTP as a password in OTP input field 1015.

When the cardholder selects a submit button 1020, the interchange computer system receives the entered password and compares it to the OTP that was generated for the transaction. If the entered password matches the generated OTP, the transaction is successfully authenticated. Otherwise, the interchange computer system may again present user interface 1000 to the cardholder and/or terminate processing of the transaction, reporting an authentication error.

Providing mobile telephone number indicator 1010 enables the cardholder to identify a mobile device to which the OTP message was sent, which may be especially valuable if the cardholder operates a plurality of mobile devices. In addition, providing mobile telephone number indicator 1010 enables the cardholder to determine whether the contact information associated with the cardholder requires updating. For example, the cardholder may no longer operate a mobile device associated with the indicated mobile telephone number. In such scenarios, the cardholder may select a wrong number link 1025.

When the cardholder selects wrong number link 1025, the interchange computer system presents a user interface for updating the contact information associated with the cardholder. For example, the interchange computer system may present user interface 800 (shown in FIG. 10) and/or user interface 900 (shown in FIG. 11). After cardholder has submitted updated contact information in such a user interface, the interchange computer system associates the updated contact information with the cardholder, transmits the original OTP message or a new OTP message (e.g., with a new OTP) to the cardholder using the updated contact information, and again presents user interface 1000.

User interfaces 800, 900, and 1000 are described above as being presented to a cardholder by an interchange computer system. In some embodiments, user interfaces 800, 900, and 1000 are presented by the interchange computer system via a cardholder computer system, such as shown in FIG. 6. For example, a user interface may be transmitted by the interchange computer system to a shopping device and presented by the shopping device to the cardholder.

While the invention has been described in terms of various specific embodiments, those skilled in the art recognizes that the invention can be practiced with modification within the spirit and scope of the claims.

Exemplary embodiments of methods, systems, and computer-readable storage media for use in implementing a financial transaction processing and/or cardholder authentication system are described above in detail. The methods, systems, and storage media are not limited to the specific embodiments described herein but, rather, operations of the methods and/or components of the system may be utilized independently and separately from other operations and/or components described herein. Further, the described operations and/or components may also be defined in, or used in combination with, other systems, methods, and/or storage media, and are not limited to practice with only the methods, systems, and storage media as described herein.

A computer device, such as those described herein, includes at least one processor or processing unit and a system memory. The computer device typically has at least some form of computer readable media. By way of example and not limitation, computer readable media include computer storage media and communication media. Computer storage media include volatile and nonvolatile, removable and non-removable physical media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

The methods described herein may be encoded as executable instructions embodied in a computer readable medium, including, without limitation, a computer storage medium, a storage device, and/or a memory device. Such instructions, when executed by a processor, cause the processor to perform at least a portion of the methods described herein.

Although the present invention is described in connection with an exemplary financial transaction processing system environment, embodiments of the invention are operational with numerous other general purpose or special purpose financial transaction processing system environments or configurations. The financial transaction processing system environment is not intended to suggest any limitation as to the scope of use or functionality of any aspect of the invention. Moreover, the financial transaction processing system environment should not be interpreted as having any dependency or requirement relating to any one or combination of components illustrated in the exemplary operating environment. Examples of well known financial transaction processing systems, environments, and/or configurations that may be suitable for use with the embodiments described herein include, but are not limited to, embedded computer devices, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments may be described in the general context of computer-executable instructions, such as program components or modules, executed by one or more computers, processors, and/or other devices. Aspects of the invention may be implemented with any number and organization of components or modules. For example, embodiments are not limited to the specific computer-executable instructions or the specific components or modules illustrated in the figures and described herein. Alternative embodiments may include different computer-executable instructions or components having more or less functionality than illustrated and described herein.

The order of execution or performance of the operations in the embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the described embodiments.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated processes. The patentable scope of the invention is defined by the claims, and may include other examples that occur to those skilled in the art. These other examples are intended to be within the scope of the claims if they have structural elements that do not differ from the literal language of the claims, or if they include equivalent structural elements with insubstantial differences from the literal languages of the claims.

What is claimed is:

1. A method for authenticating an identity of a cardholder in a financial transaction initiated by the cardholder with a merchant via a first communication medium, said method comprising:
    receiving a purchase authentication request message from the merchant at an interchange computer system, the purchase authentication request message associated with the cardholder and the financial transaction;
    generating a one-time password for the financial transaction at the interchange computer system;
    transmitting the one-time password to the cardholder via a second communication medium different from the first communication medium;
    prompting the cardholder, by the interchange computer system, to enter the one-time password;
    receiving, by the interchange computer system, an entered one-time password from the cardholder via the second communication medium;
    determining that the entered one-time password is equal to the generated one-time password; and
    transmitting a positive purchase authentication response message to the merchant indicating a successful authentication of the identity of the cardholder.

2. The method in accordance with claim 1, wherein transmitting the one-time password via the second communication medium comprises transmitting the one-time password to a predefined mobile telephone number as a short message service (SMS) message.

3. The method in accordance with claim 2, further comprising:
    registering the cardholder in the interchange computer system; and
    associating the predefined mobile telephone number with the cardholder in the interchange computer system.

4. The method in accordance with claim 1, further comprising:
    determining whether the one-time password is successfully delivered to the cardholder; and
    when the one-time password is not successfully delivered to the cardholder, providing a transmission failure notification to the cardholder.

5. The method in accordance with claim 4, further comprising:
    receiving a re-send request from the cardholder prompting the re-sending of the one-time password; and
    re-sending the one-time password to the cardholder via the second communication medium.

6. The method in accordance with claim 1, further comprising transmitting transaction data to the cardholder via the second communication medium, the transaction data including data representing the financial transaction.

7. The method in accordance with claim 6, wherein transmitting data includes transmitting at least one of a transaction number, a transaction amount, a merchant name, and a portion of an account number associated with the cardholder.

8. The method in accordance with claim 1, further comprising, prior to receiving the purchase authentication request message:
    receiving a verify enrollment request message including an account number associated with the cardholder from the merchant; and
    based at least in part on determining that the account number associated with the cardholder is included in a collection of account numbers enrolled in an authentication program, transmitting a positive verify enrollment response message to the merchant indicating that payer authentication is available for the cardholder.

9. The method in accordance with claim 1, wherein the positive authentication response message is transmitted based further on receiving the entered one-time password from the cardholder via the second communication medium.

10. The method in accordance with claim 1, wherein generating the one-time password comprises generating a sequence of random characters.

11. A system for authenticating an identity of a cardholder in a financial transaction initiated by the cardholder with a merchant computer system via a first communication medium, said system comprising:
- a memory device configured to store contact information associated with the cardholder;
- a communication interface configured to receive a purchase authentication request message from a merchant computer system;
- a processor coupled to said memory device and said communication interface, said processor programmed to:
  - generate a one-time password for the financial transaction;
  - provide the one-time password to the cardholder via a second communication medium different from the first communication medium using the contact information associated with the cardholder;
  - prompt the cardholder to enter the one-time password;
  - receive an entered one-time password from the cardholder via the second communication medium:,
  - determine that the entered one-time password is equal to the generated one-time password; and
  - transmit a positive purchase authentication response message to the merchant computer system indicating a successful authentication of the identity of the cardholder via said communication interface.

12. The system in accordance with claim 11, wherein said memory device is configured to store a mobile telephone number associated with the cardholder, and said processor is programmed to provide the one-time password to the cardholder by transmitting the one-time password to the mobile telephone number as a short message service (SMS) message.

13. The system in accordance with claim 11, wherein said processor is further programmed to:
- determine whether the one-time password is successfully delivered to the cardholder; and
- when the one-time password is not successfully delivered to the cardholder, provide a transmission failure notification to the cardholder via the communication interface.

14. The system in accordance with claim 13, wherein said communication interface is configured to receive a re-send request from the cardholder prompting the re-sending of the one-time password, and said processor is further programmed to re-send the one-time password to the cardholder via the second communication medium based on the re-send request.

15. The system in accordance with claim 11, wherein said processor is further programmed to transmit transaction data to the cardholder via the second communication medium, the transaction data representing the financial transaction.

16. The system in accordance with claim 15, wherein said processor is further programmed to extract at least a portion of the transaction data from the purchase authentication request message.

17. The system in accordance with claim 15, wherein said processor is programmed to transmit the transaction data at least in part by transmitting a transaction amount associated with the financial transaction.

18. The system in accordance with claim 11, wherein:
- said memory device is further configured to store a collection of account numbers enrolled in an authentication program;
- said communication interface is further configured to, prior to receiving the purchase authentication request message, receive a verify enrollment request message including an account number associated with the cardholder from the merchant computer system; and
- said processor is further programmed to, based at least in part on determining that the account number associated with the cardholder is included in the collection of account numbers, transmit a positive verify enrollment response message to the merchant computer system via said communication interface, the positive verify enrollment response message indicating that payer authentication is available for the financial transaction.

19. The system in accordance with claim 11, wherein said memory device is further configured to store a predefined password associated with the cardholder, and said processor is further programmed to:
- prompt the cardholder to enter the predefined password; and
- transmit the positive purchase authentication response message based further on determining that the entered predefined password is equal to the predefined password associated with the cardholder.

20. A computer-readable storage medium that includes computer executable instructions for authenticating an identity of a cardholder in a financial transaction initiated by the cardholder with a merchant via a first communication medium, said computer executable instructions configured to instruct a computer to:
- receive a purchase authentication request message from the merchant, the purchase authentication request message associated with the cardholder and the financial transaction;
- generate a one-time password for the financial transaction, the one-time password including a sequence of random characters;
- transmit the one-time password to the cardholder via a second communication medium different from the first communication medium;
- prompt the cardholder to enter the one-time password;
- receive an entered one-time password from the cardholder via the second communication medium,
- determine that the entered one-time password is equal to the generated one-time password; and
- transmit a positive purchase authentication response message to the merchant indicating a successful authentication of the identity of the cardholder.

* * * * *